Figure 1:
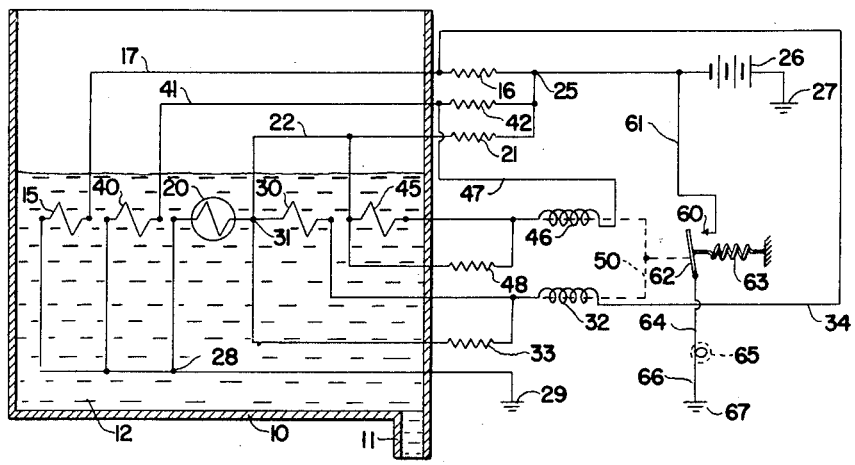

Dec. 20, 1960   D. C. JOHNSTON ET AL   2,965,888
LIQUID LEVEL SENSING APPARATUS
Filed Jan. 14, 1957

INVENTOR.
DONALD C. JOHNSTON
WILLIAM R. WILSON
BY
*Philip J. Zeimack*
ATTORNEY

United States Patent Office 2,965,888
Patented Dec. 20, 1960

2,965,888

LIQUID LEVEL SENSING APPARATUS

Donald C. Johnston, Richfield, and William R. Wilson, St. Louis Park, Minn., assignors to Minneapolis-Honeywell Regulator Company, Minneapolis, Minn., a corporation of Delaware Filed Jan. 14, 1957, Ser. No. 634,007

7 Claims. (Cl. 340—244)

This invention is directed to a condition sensing apparatus wherein the unbalance or output signals from essentially two bridge networks are caused to act on a common means upon a predetermined condition occurring, so as to insure that an adequate output is supplied in a relatively short period of time by the bridge networks to operate the common means.

When utilizing negative temperature coefficient resistors or thermistors to sense a condition or change of a condition, the characteristic that thermistors dissipate heat at a rate dependent upon the medium to which they are exposed can be utilized. Thus, negative temperature coefficient resistors or thermistors do not dissipate heat as readily to air as they do to liquid. As the resistance of thermistors is dependent upon the temperature at which they are operating, the fact that thermistors do not dissipate heat as readily to air as they do to liquid causes their temperature to rise, and hence their resistance to lower when they are exposed to air, as opposed to liquid. By utilizing this principle, thermistors may be incorporated into liquid level sensing apparatus.

A common type of liquid level sensing apparatus takes the form of a Wheatstone bridge wherein a sensing thermistor is located in one of the arms thereof and is associated with a plurality of resistive elements in the other arms thereof, so that the bridge is balanced and no output signal appears across the detecting leg when the sensing thermistor is exposed to one medium and unbalanced and an output signal appears across the detecting leg when the sensing thermistor is exposed to a second medium. This type of arrangement is adequate when the variations in ambient temperature to which the arrangement is exposed are within a limited range. However, when the variations in temperature to which the arrangement is exposed extend over quite a range, such as in aircraft applications, provision must be made for the changes in resistance of the sensing thermistor resulting from changes in ambient temperature. It should be here noted that while the resistance of a thermistor is primarily due to the type of medium to which it is exposed, its resistance also varies as a function of the ambient temperature to which it is exposed. By providing a second or reference thermistor in an adjacent leg or opposite leg of the bridge provision can be made for compensating for the variations in resistance of the sensing thermistor which arise as a result of changes in the ambient temperature to which the sensing thermistor is exposed.

If it is desired to have the arrangement balanced when the sensing thermistor is in a liquid, then the reference thermistor is located in an area where it will always be subjected to a representative quantity of the liquid. Thus, should the temperature of the liquid change, it will have an equal effect on both the sensing thermistor and the reference thermistor, and therefore, the resistance of both will change in an equal amount, providing of course that the thermistors are matched as to their characteristics. Another method for providing ambient temperature compensation involves the use of a reference thermistor surrounded by air and encased by a shield and located proximate to the sensing thermistor. This type of reference thermistor is utilized in an arrangement wherein the bridge is unbalanced in fuel and balanced in air. With this type of arrangement, the reference thermistor is not aware of changes in the medium to which it is exposed and is merely aware of the actual ambient temperature of the medium surrounding it. Thus, when the sensing thermistor and the reference thermistor are exposed to air, any changes in ambient temperature will result in equal amounts of resistance change in both the sensing and reference thermistors. Inasmuch as ambient temperature variations are not critical when the apparatus is in the unbalanced condition, no ambient temperature compensation is provided for the unbalanced condition.

While, as it has been noted above, the bridge can be unbalanced either in liquid or in air, a preferable arrangement is of the type wherein the bridge is unbalanced in liquid and balanced in air. With this type of arrangement a shielded reference thermistor is utilized and disposed proximate to the sensing thermistor. Thus, from a design standpoint both the sensing thermistor and the reference thermistor can be included in a single probe holding the thermistors. It is this type of arrangement which will be considered in the remainder of the specification. Of course, it should be recognized that the teachings contained herein could be applied equally well to an arrangement, such as described above, wherein the reference thermistor is always exposed to the liquid and wherein the bridge is balanced in liquid and unbalanced in air.

Utilizing apparatus of the type described above in a system for sensing the level of hot fluids such as hot lubricating oils, a problem arises in that the sensing thermistor dissipates approximately the same amount of heat in air as it does in the hot oil. Thus, as the sensing thermistor moves from the oil medium to the air medium, or vice-versa, the change in heat dissipation rate of the thermistor from oil to air or vice-versa is sufficient to cause heating or cooling of the sensing thermistor, as the case may be, however, the heating or cooling is very slow. The slow heating or cooling of the sensing thermistor results in a substantial interval of time being set up between the time the sensing thermistor is initially exposed to the air or oil and the time at which a proper voltage condition is set up across the detecting leg of the bridge to cause a control means or an indication means to be energized or deenergized as the case may be.

It is possible, of course, to energize the bridge with a sufficiently high voltage to bring about a rapid heating and a higher ultimate temperature of the thermistor when it is exposed to air, however, in many installations this is not desirable because of the explosive atmospheres to which the thermistors are exposed. In these installations, any possibility of explosion, due to a break in the leads connecting the thermistors, or due to overheating the thermistors, or due to some other reason, cannot be tolerated.

The present invention was devised to eliminate the problems discussed above. To this end, an arrangement is provided that is comprised essentially of two bridge networks, each of which have a sensing thermistor, each of which share a common branch, and each of which have means located in the detecting leg thereof subject to the unbalance or output signals of the bridge networks to thereby co-act on a common output means.

The common branch mentioned above includes the reference thermistor, therefore, only one reference thermistor is required for the two bridges. Further, as will be more fully explained below, the utilization of but a single reference thermistor actually accelerates the operation of the arrangement, thereby requiring less of a time interval for an adequate unbalance signal to arise to cause operation of the means located in the detecting leg in each branch of the bridge. By having the means located in each detecting leg of each bridge act on a common output means, it can be appreciated that a greater accumulative output is effective to act on the common output means than would be the case where a single bridge is utilized under the same circumstances and therefore, the interval of time required to cause operation of the common output means is correspondingly reduced upon the sensing thermistors having the medium to which they are exposed changed.

It is an object of this invention to provide apparatus to sense the level of a liquid by means of an arrangement wherein the output signals of two bridges act concurrently on a common output means.

It is a further object of this invention to provide a liquid level sensing apparatus of the bridge network type, wherein a reference impedance is utilized with a sensing impedance to compensate for ambient temperature changes, comprised essentially of two bridge networks each including a sensing impedance but the apparatus including but a single reference impedance.

Another object of this invention is to provide a liquid level sensing apparatus of the last mentioned type wherein thermistors are utilized as the sensing and reference impedances and wherein the response time of the apparatus upon an unbalance occurring is accelerated due to the utilization of a single reference thermistor.

It is still another object of this invention to provide a thermistor liquid level sensing apparatus comprised essentially of two bridge networks for use in media having approximately the same heat transfer properties wherein sufficient output signals can be provided in a relatively short period of time.

These and other objects of the invention will become apparent from a reading of the following specification and appended claims.

In Figure 1 of the drawing, an electrical schematic arrangement of the liquid level sensing apparatus is shown associated with a container.

Figure 2:
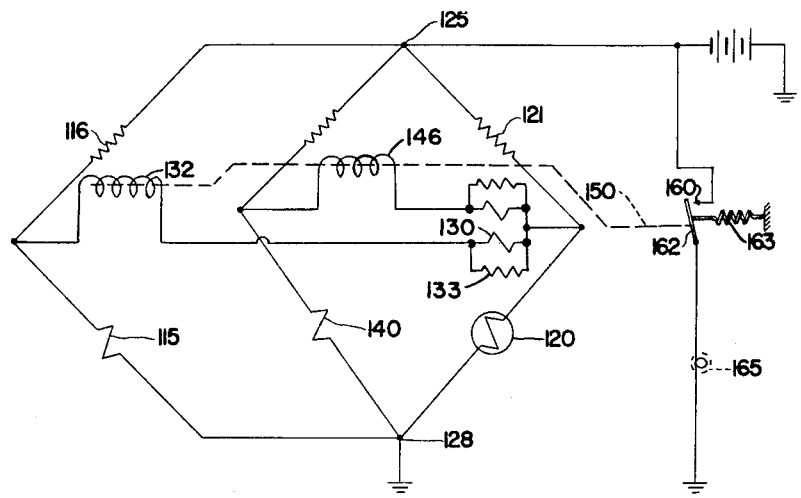

Figure 2 of the drawing shows the liquid level sensing apparatus of Figure 1 in conventional bridge schematic form.

In Figure 1, a container 10 having an outlet 11 is partially filled with a fluid 12, such as hot lubricating oil. Disposed within the container 10 are sensing thermistors, a reference thermistor, and compensating thermistors utilized in a liquid level sensing apparatus.

A first bridge of the apparatus is comprised of a first sensing negative temperature coefficient thermistor 15 and a resistor 16 joined together by conductor 17. A second branch of the first bridge includes a reference negative temperature coefficient thermistor 20 surrounded by air and encased by a shield and a resistor 21 joined together by conductor 22. Resistors 16 and 21 each have a portion connected to a first input terminal of the bridge 25, to which a source of voltage 26, grounded or connected to reference potential at 27, is connected. The first sensing thermistor 15 and the reference thermistor 20 each have a portion connected to the other input terminal 28 of the bridge which in turn is connected to ground or reference potential at 29, thus providing a complete electrical circuit from the ground or reference potential 27, through the source of voltage 26, to the input terminal 25 of the bridge, through the electrical components of the bridge, to the output terminal 28 of the bridge and back to ground or reference potential 29.

The detecting leg of the first bridge includes a first compensating negative temperature coefficient resistor or thermistor 30 having one portion connected to a terminal 31 disposed between the reference thermistor 20 and the resistance 21 forming the second branch of the first bridge and having a second portion thereof connected to a condition or voltage responsive device, which is shown in the form of a relay winding 32. A resistor 33 is connected in parallel across the compensating thermistor. Conductor 34 connects a second portion of the relay winding 32 to a point located between the sensing thermistor 15 and the resistor 16, thereby completing the detecting leg.

At this point it should be noted that the bridge just described is of the type shown and described in the copending Donald C. Johnston application, Serial No. 459,702, filed October 1, 1954, and assigned to the present assignee.

A second bridge of the liquid level sensing apparatus has a first branch comprised of a second sensing negative temperature coefficient resistor or thermistor 40 operatively connected by conductor 41 to a resistor 42. It will be noted that the first branch of the second bridge is connected in parallel to the first and second branches of the first bridge. The second branch of the second bridge consists of the second branch of the first bridge. Thus, reference thermistor 20 and resistor 21 are included in a branch that is connected in parallel with the first branch of the first bridge consisting of the first sensing thermistor 15 and resistor 16 and further connected in parallel with the first branch of the second bridge consisting of the second sensing thermistor 40 and resistor 42. It will be noted that the second bridge utilizes the same input terminals 25 and 28 and the same source of voltage 26 as does the first bridge, thereby resulting in a complete electrical circuit of the type traced out with regard to the first bridge.

The detecting leg for the second bridge comprises a second compensating negative temperature coefficient resistor or thermistor 45 having a first portion effectively connected to the junction 31 and having a second portion thereof connected to a first portion of a condition or voltage responsive device, which is shown in the form of a relay winding 46. The second portion of the relay winding 46 is connected by conductor 47 to a junction located between the second sensing thermistor 40 and resistor 42, thereby completing the detecting leg. Resistor 48 is connected in parallel across the compensating thermistor 45.

It will be noted that all of the thermistors, sensing, reference, and compensating, are located at the same level within the container. With this type of arrangement all of the thermistors are immersed in a common medium and upon withdrawal therefrom are simultaneously immersed in another medium.

Relay windings 32 and 46 are shown as being separate and independent of each other and acting on a common armature 50. It should be here pointed out that the relay windings 32 and 46 could be wound on a common bobbin. Further, it should be mentioned that the effects resulting from energization of relay windings 32 and 46 are cumulative.

A warning or indication arrangement for the liquid level sensing apparatus, which is to be energized or actuated upon a change in the liquid level, is included and comprises a switch contact 60 associated with a conductor 61 which is connected to the source of voltage 26. Further, a switch blade 62, normally biased to a closed position by the spring 63, is operatively connected to the common armature 50. Conductor 64 connects the switch blade 62 to a control or warning device 65, in the form of a light, which in turn is connected to a conductor 66, operatively connected to ground or reference potential at 67. It is apparent that a complete electrical circuit exists, when the relay windings 32 and 46 are de-energized and the switch blade 62 is biased against switch contact by the spring 63, from ground or reference potential 27, through the source of voltage 26, to the switch contact 60 and switch blade 62, to the warning device 65 and back to ground or reference potential 67.

As shown, all of the thermistors, sensing, reference, and compensating are immersed in a liquid, such as hot lubricating oil, and the components of the apparatus are so chosen that the bridges are unbalanced under these conditions. That is, an unbalance voltage appears across the detecting legs of the two bridges causing the relay windings 32 and 46 to be energized and the common armature 50 positioned to the left, the switch blade 62 disengaged from the switch contact 60 and the warning device 65 de-energized. Further, the components of the apparatus are so chosen that the bridges are balanced and the relay windings 32 and 46 de-energized when the thermistors are withdrawn from the liquid and exposed to air.

For ease of explanation, the liquid level sensing apparatus described above has been redrawn in conventional bridge network form and is shown in Figure 2. All of the reference numerals of Figure 2 correspond to the reference numerals of Figure 1, except that they are 100 numbers higher.

As mentioned previously, a bridge of the Wheatstone form and comprised of a sensing thermistor 115 and resistor 116 located in the first branch thereof; a reference thermistor 120 and a resistor 121 located in a second branch; a compensating thermistor 130 connected in parallel with a resistor 133, the combination connected in series with a condition or voltage responsive device 132 located in the detecting leg; and having input terminals 125 and 128 is the same type of bridge arrangement set forth in the forementioned Donald C. Johnston application. As explained therein, thermistors have the attribute of having their resistance change dependent upon the medium to which they are exposed, due to the fact that their heat dissipation rate varies from one medium to another. Thus, by using a thermistor for a sensor and utilizing its change in resistance, a determination can be had that the thermistor has been transferred from one medium to another.

However, as was pointed out previously, changes in ambient temperature also affect the heat dissipation rate of the thermistors in the various media. Therefore, it is necessary, in most installations, to compensate for this change in ambient temperature, dependent upon whether the bridge is balanced in air and unbalanced in liquid or vice-versa. To this end, in this particular embodiment, the sensing thermistor is located in a first leg of a Wheatstone bridge and a second thermistor known as a reference thermistor, which is surrounded by air and encased in a shield and thereby isolated from direct contact with the medium but exposed to the ambient temperature thereof, is located in a second adjacent or opposite leg of the bridge. These thermistors are matched so that any change in ambient temperature when both are exposed to air will result in equal changes in their resistances. Further, the sensing and the reference thermistor are located at the same level, so that they are both subjected to the same medium at the same time. Thus, when the sensing thermistor and the reference thermistor are exposed to air, any changes in ambient temperature will change the resistance of the sensing thermistor, however, due to the matching, the same change in ambient temperature will also affect the reference thermistor in a like manner thereby restoring, or maintaining, balance of the bridge. Since the reference thermistor is responsive only to ambient temperature and is not affected by the medium in which it is immersed, the withdrawal of the sensing and reference thermistors, from a first medium and an immersion in a second medium causes a change in resistance of only the sensing thermistor, assuming the ambient temperatures of both media to be the same, thereby causing a voltage condition to occur across the detecting leg of the bridge which can be utilized directly or indirectly to give a warning, to cause a pump to transfer liquid to the container wherein the apparatus is contained, etc.

If the sensing and reference thermistors are located in a very cold medium prior to power being applied to the bridge, there is a possibility of shorting out the sensing thermistor. Thus, if the thermistors are located in very cold liquid, the resistance of the thermistors is very high. Upon the application of power to the bridge, current will flow through both thermistors, however, due to the fact that the reference thermistor is encaused by a shield, its resistance goes down faster than does the resistance of the sensing thermistor, as the reference thermistor does not dissipate its heat to the medium in which it is in, as does the sensing thermistor. Thus, as the sensing thermistor is giving off its heat to the cold liquid, its resistance varies very little, however, as the reference thermistor heats up, its resistance is reduced considerably. This results in an unbalance voltage occurring across the detecting leg of the bridge in such a manner as to allow an increased current flow through the detecting leg and through the reference thermistor, thereby further increasing its tempeature and reducing its resistance. Of course, it can be seen as this process continues, the temperature of the reference thermistor and hence its resistance continues to decrease at an accelerating rate until the sensing thermistor is effectively short-circuited, and thus unable to attain its normal operating temperature. To overcome this shortcoming, the invention set forth in the forementioned Donald C. Johnston application was devised, and it was drawn to an arrangement wherein a compensating thermistor was located in the detecting leg of the bridge. The inclusion of the compensating thermistor effectively blocks the current flow through the detecting leg and directs the current through the sensing thermistor, thereby bringing the reference and sensing thermistor up to operating temperature almost simultaneously. This aspect is of no cornern here and is merely inserted for explanation purposes.

When measuring the level of liquid having approximately the same heat transfer properties as air by means of thermistors, a problem arises as to the operation of the apparatus. Thus, if the heat dissipation rates of the sensing thermistors in hot oil and air are quite similar, upon a transfer of the thermistors from one medium to the other, such a great deal of time will be required to either heat or cool the sensing thermistors to such an extent as to provide the proper voltage conditions across the detecting leg to energize or de-energize, as the case may be, the voltage responsive means, that it will seriously interfere with the effectiveness of the apparatus. Since the voltage condition across the detecting leg of the bridge is determined by how much current flows through the sensing thermistor to cause its resistance to change, and since change in current flow through the sensing thermistor is determined by the difference in heat dissipation rates of the thermistors in air and the medium being measured, the fact that air and hot oil have substantially the same heat dissipation factors is of great concern.

By providing two bridges, each sharing a common branch and having the unbalance voltage of each bridge act concurrently on a common output means, an arrangement has been provided wherein a thermistor can sense the change from one medium to another where both media have approximately the same heat transfer properties with respect to the thermistors.

As shown in Figure 2, the first and second bridges are both unbalanced and the armature 150 is pulled to the left by the relay windings 132 and 146 so as to cause the switch blade 162 to be dis-engaged from the switch contact 160, thereby de-energizing the warning devices 165. What this of course means is that sensing thermistors 115 and 140 are dissipating more heat to the oil than the reference thermistor 120 is dissipating to the air enclosed within its shield. Thus, the resistance of the sensing thermistors 115 and 140 is higher than the resistance of the reference thermistor 120. This causes an unbalance voltage to exist across each of the detecting legs and therefore the relay windings 132 and 146 are energized and the switch blade 162 is in the position shown.

Should the thermistors, which are all at the same level, be withdrawn from the oil and exposed to air, it can be seen that the resistances of the sensing thermistors 115 and 140 are simultaneously reduced as they are heated up and approach the resistance of the reference thermistor 120. This of course results in the unbalance voltage disappearing across the detecting legs of the bridges and causes the de-energization of the relay windings 132 and 146, thereby allowing the switch blade 162 to be retracted under the bias of the spring 163, resulting in energization of the warning device 165.

Now, should the thermistors be once again inserted into the oil, the resistances of the sensing thermistors 115 and 140 are increased thereby creating an unbalance voltage across the detecting leg of each bridge. This unbalance voltage causes current to flow through the detecting legs and the unbalance voltage is in such a direction as to cause the current to flow through the reference thermistor 120, thereby heating up that thermistor so as to lower its resistance. It can be seen that if two bridges of the type shown are utilized, twice as much current will be passed through the reference thermistor 120 than if but one bridge was used. This results in the temperature of the reference thermistor being increased at a more rapid rate than if but one bridge were utilized. Thus, the difference in resistance between the reference thermistor 120 and the sensing thermistors 115 and 140 is caused to accelerate and reach a greater differential in a shorter period of time than if one bridge were utilized. Of course, as the resistance of the reference thermistor 120 is lowered a greater voltage differential appears across the detecting legs of the bridges which is sufficient to allow the relay windings 132 and 146 to be energized to cause the movement of the armature 150 in a much shorter period of time than if but one bridge or two separate and distinct bridges were utilized.

Thus, it can be seen that by utilizing an arrangement as set forth, an operative thermistor liquid level sensing apparatus has been provided for use with media having approximately the same heat transfer properties wherein a low power input is required, and wherein a relatively rapid response time results upon the sensing thermistors being transferred from one medium to another. Further, this type of thermistor liquid level sensing apparatus requires the use of but one reference thermistor, as opposed to the two that would be required if two separate bridges were utilized, which acts to accelerate the response time of the apparatus.

While only the preferred embodiment has been shown, it should be recognized that the scope of the invention should be determined from the following claims, in which we claim:

1. In liquid level sensing apparatus for determining the level of liquid within a container, the combination comprising a source of voltage; a first bridge network having input terminals connected to said source of voltage and output terminals, a first branch including a first liquid level sensing thermistor arranged to be disposed at a level within the container, a second branch including a reference thermistor exposed to a first medium and located proximate to said sensing thermistor, and a detecting leg connected to said output terminals and including a first relay winding; a second bridge network having input terminals connected to said source of voltage and second output terminals, a first branch including a second liquid level sensing thermistor located proximate to said first liquid level sensing thermistor, said second branch of said first bridge forming the second branch of said second bridge, and a detecting leg connected to said second output terminals and including a second relay winding; and a common armature for said relay windings operatively connected to a signalling device; said first bridge and said second bridge arranged to be in a balanced condition dependent upon said first medium surrounding said first liquid level sensing thermistor and said second liquid level sensing thermistor and arranged to become unbalanced simultaneously dependent upon a second medium surrounding said first liquid level sensing thermistor and said second liquid level sensing thermistor to cause concurrent energization of said first relay winding and said second relay winding and actuation of said armature.

2. In liquid level sensing apparatus for determining the level of liquid within a container, the combination comprising a source of voltage; a first bridge network having input terminals connected to said source of voltage and output terminals, a first branch including a first liquid level sensing thermistor arranged to be disposed at a level within the container, a second branch including a reference thermistor exposed to a first medium and located proximate to said sensing thermistor, and a detecting leg connected to said output terminals and comprising a first voltage responsive means including an output member; and a second bridge network having input terminals connected to said source of voltage and second output terminals, a first branch including a second liquid level sensing thermistor located proximate to said first liquid level sensing thermistor, said second branch of said first bridge forming the second branch of said second bridge, and a detecting leg connected to said second output terminals and comprising a second voltage responsive means including said output member; said first bridge and said second bridge arranged to be in a balanced condition upon said first medium surrounding said first liquid level sensing thermistor and said second liquid level sensing thermistor and arranged to become unbalanced simultaneously upon a second medium surrounding said first liquid level sensing thermistor and said second liquid level sensing thermistor to cause concurrent operation of said first voltage responsive means and said second voltage responsive means to operate said output member.

3. In liquid level sensing apparatus for determining the level of liquid within a container, the combination comprising a source of voltage; a first bridge network having input terminals connected to said source of voltage and output terminals, a first branch including a first liquid level sensing thermistor arranged to be disposed at a level within the container, a second branch including a reference thermistor exposed to a first medium, and a detecting leg connected to said output terminals and comprising a first voltage responsive means including an output member; and a second bridge network having input terminals connected to said source of voltage and second output terminals, a first branch including a second liquid level sensing thermistor located proximate to said first liquid level sensing thermistor, said second branch of said first bridge forming the second branch of said second bridge, and a detecting leg connected to said second output terminals and comprising a second voltage responsive means including said output member; said first bridge and said second bridge arranged to be in a balanced condition upon said first medium surrounding said first liquid level sensing thermistor and said second liquid level sensing thermistor and arranged to become unbalanced simultaneously upon a second medium surrounding said first liquid level sensing thermistor and said second liquid level sensing thermistor to cause concurrent operation of said first voltage responsive means and said second voltage responsive means to operate said output member.

4. In apparatus for determining the level of fluid within a container, the combination comprising a source of voltage; a first bridge network having input terminals connected to said source of voltage and output terminals, a first branch including a first fluid level sensing thermistor arranged to be disposed at a level within the container, a second branch, and a detecting leg connected to said output terminals and comprising a first voltage responsive means including an output member connected to said output terminals; and a second bridge network having input terminals connected to said source of voltage and second output terminals, a first branch including a second fluid level sensing thermistor located proximate to said first fluid level sensing thermistor, said second branch of said first bridge forming the second branch of said second bridge, and a detecting leg connected to said second terminals and comprising a second voltage responsive means including said output member; said first bridge and said second bridge arranged to be in a balanced condition upon a first medium surrounding said first fluid level sensing thermistor and said second fluid level sensing thermistor and arranged to become unbalanced simultaneously upon a second medium surrounding said first fluid level sensing thermistor and said second fluid level sensing thermistor to cause concurrent operation of said first voltage responsive means and said second voltage responsive means to operate said output member.

5. In condition sensing apparatus, the combination comprising a source of voltage; a first bridge network having input terminals connected to said source of voltage and output terminals, a first branch including a first condition sensing impedance; a second branch, and a detecting leg connected to said output terminals, comprising first means including an output member responsive to the condition of said bridge; a second bridge network having input terminals connected to said source of voltage and second output terminals, a first branch including a second condition sensing impedance, said second branch of said first bridge forming the second branch of said second bridge, and a detecting leg connected to second said output terminals, comprising second means including said output member responsive to the condition of said bridge; said first bridge and said second bridge arranged to be in a balanced condition dependent upon the occurrence of a first condition to which the first condition sensing impedance and the second condition sensing impedance are exposed and arranged to become unbalanced simultaneously dependent upon the occurrence of a second condition to which the first condition sensing impedance and the second condition sensing impedance are exposed to cause concurrent operation of said first means and said second means to operate said output member.

6. In condition sensing apparatus, the combination comprising a source of voltage; a first bridge network having input terminals connected to said source of voltage and output terminals, a first branch including a first condition responsive means; a second branch, and a detecting leg connected to said output terminals, comprising first means including an output member responsive to the condition of said bridge; a second bridge network having input terminals connected to said source of voltage and second output terminals, a first branch including a second condition responsive means, said second branch of said first bridge forming the second branch of said second bridge, and a detecting leg connected to said second output terminals, comprising second means including said output member responsive to the condition of said bridge; said first bridge and said second bridge arranged to be in a balanced condition dependent upon the occurrence of a first condition to which the first condition responsive means and the second condition responsive means are exposed and arranged to become unbalanced simultaneously dependent upon the occurrence of a second condition to which the first condition responsive means and the second condition responsive means are exposed to cause concurrent operation of said first means and said second means to operate said output member.

7. A plurality of condition sensing impedance elements; means connecting said elements in first branches of a like plurality of bridge circuits, said elements normally being exposed to substantially the same condition; further impedance means; means connecting said further impedance means in said bridge circuits so that said further impedance means simultaneously comprises the second branch of each bridge circuit; means independent of said further impedance means connected to said bridge circuits to supply energy thereto; a like plurality of voltage responsive devices; means connecting said devices in said bridge circuits to comprise the detection legs thereof; and means combining the responses of said devices to produce a joint effect.

References Cited in the file of this patent

UNITED STATES PATENTS

| | | |
|---|---|---|
| 2,246,575 | Coleman | June 24, 1941 |
| 2,768,347 | Hansen | Oct. 23, 1956 |
| 2,824,278 | Johnston | Feb. 18, 1958 |

FOREIGN PATENTS

| | | |
|---|---|---|
| 129,741 | Great Britain | July 24, 1919 |